US006738149B2

(12) United States Patent
Watanabe (10) Patent No.: US 6,738,149 B2
(45) Date of Patent: May 18, 2004

(54) METHOD AND APPARATUS FOR SELECTING A PREFERENTIAL FONT

(75) Inventor: Yoko Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 08/007,093

(22) Filed: Jan. 21, 1993

(65) Prior Publication Data

US 2002/0060800 A1 May 23, 2002

(30) Foreign Application Priority Data

Jan. 27, 1992 (JP) .............................................. 4-035659
Jun. 1, 1992 (JP) .............................................. 4-140571

(51) Int. Cl.[7] .......................... G06F 15/00; G06K 15/00
(52) U.S. Cl. ....................................... 358/1.11; 358/1.1
(58) Field of Search ................................ 395/109, 110, 395/115, 150, 151, 101, 117, 790, 791, 805; 345/467, 468, 469, 144, 417; 707/512, 517, 527, 542

(56) References Cited

U.S. PATENT DOCUMENTS

| | | | | |
|---|---|---|---|---|
| 4,298,945 A | | 11/1981 | Kyte et al. ................... 364/523 |
| 4,594,674 A | * | 6/1986 | Boulia et al. ................. 364/523 |
| 4,682,198 A | | 7/1987 | Sakurada et al. ........... 264/523 |
| 4,686,525 A | * | 8/1987 | Nagata ........................ 340/790 |
| 4,715,006 A | * | 12/1987 | Nagata ........................ 395/110 |
| 4,837,712 A | * | 6/1989 | Shibamiya ................... 395/150 |
| 4,881,197 A | * | 11/1989 | Fischer ........................ 364/900 |
| 4,922,448 A | | 5/1990 | Kunieda et al. ............. 364/900 |
| 4,933,865 A | | 6/1990 | Yamamoto et al. .......... 364/518 |
| 4,949,281 A | | 8/1990 | Hillenbrand et al. ........ 364/518 |
| 4,959,801 A | | 9/1990 | Apley et al. ................. 364/518 |
| 4,962,465 A | | 10/1990 | Saito et al. ................... 364/518 |
| 4,987,550 A | | 1/1991 | Leonard et al. ............. 364/521 |
| 5,092,686 A | * | 3/1992 | Tsukamoto ................... 400/83 |
| 5,142,613 A | * | 8/1992 | Morikawa et al. ........... 395/110 |
| 5,167,013 A | * | 11/1992 | Hube et al. .................. 395/110 |
| 5,185,818 A | * | 2/1993 | Warnock ....................... 382/54 |
| 5,233,685 A | | 8/1993 | Landes et al. ............... 394/147 |
| 5,293,477 A | | 3/1994 | Matoba ........................ 395/151 |
| 5,359,344 A | * | 10/1994 | Inoue et al. ................. 345/100 |

FOREIGN PATENT DOCUMENTS

| | | | |
|---|---|---|---|
| EP | 0356104 | 2/1990 | |
| EP | 425218 | 5/1991 | .......... G06K/15/02 |
| EP | 440359 | 8/1991 | .......... G06K/15/12 |
| GB | 2217491 | 10/1989 | .......... G06K/15/10 |
| JP | 62-255993 | 11/1987 | |
| JP | 63173651 | 7/1988 | |
| JP | 63276571 | 11/1988 | |
| JP | 3-270954 | 12/1991 | |

OTHER PUBLICATIONS

HP DeskJet Printer Owner's Manual, Manual Part No. 02276–90039, Programming, pp. 4–1 to 4–3 and 4–8 to 4–9.
DeskJet Printer Owner's Manual 02276–90039, (Apr. 1989) Hewlett Packard.
"Digital Fonts For Low–Cost Typesetting Systems," Compcon Digest of Papers 186, Collins, Mar. 3, 1986, pp. 82–87.
Database Inspec (IEEE) AN:86:2643538 (Feb. 1986).
Database Inspec (IEEE) AN:79:1334215 (Sep. 1978).

* cited by examiner

*Primary Examiner*—Gabriel Garcia
(74) *Attorney, Agent, or Firm*—Fitzpatrick, Cella, Harper & Scinto (57) ABSTRACT

An outputting apparatus such as a laser beam printer comprises a memory to store designation information to designate a selection-impossible font from a plurality of fonts and a selector to select a font which is most adaptive from the fonts other than the selection instructed font in accordance with an input of selection instruction information to instruct so as to select the selection-impossible font that is designated by the designation information stored in the memory. The plurality of fonts include internal fonts provided in the apparatus and fonts which are supplied from the outside.

21 Claims, 10 Drawing Sheets

| FONT NAME | SELECTION POSSIBLE | SELECTION IMPOSSIBLE |
|---|---|---|
| FONT A | 0 | 1 |
| FONT B | 1 | 0 |
| FONT C | 1 | 0 |

FONT A : SELECTION IMPOSSIBLE
FONT B : SELECTION POSSIBLE
FONT C : SELECTION POSSIBLE

FIG. 10

|  | FONT A | FONT B | FONT C |
|---|---|---|---|
| ATTRIBUTE 1 | a | a | a |
| ATTRIBUTE 2 | b | b | b |
| ATTRIBUTE 3 | c | c | c |
| ATTRIBUTE 4 | d | d | d |
| ATTRIBUTE 5 | e | e | f |
| ATTRIBUTE 6 | x | y | z |

METHOD AND APPARATUS FOR SELECTING A PREFERENTIAL FONT

BACKGROUND OF THE INVENTION

1. Field of the Invention

The present invention relates to the outputting apparatus and method of a printer, a display (CRT, LCD), or the like in which information supplied from the outside is analyzed and the information is transformed into a visible image form on the basis of the result of the analysis and is outputted.

2. Related Background Art

Hitherto, in an outputting apparatus, a font is selected on the basis of information regarding the font selection supplied from the outside. In the case where the font is newly added without changing the information supplied from the outside, the added font cannot be selected unless the information regarding the font selection supplied from the outside is changed. As a result, there is a problem such that even when the number of kinds of fonts increases, the fonts cannot be effectively used.

SUMMARY OF THE INVENTION

The present invention is made in consideration of the above circumstances and it is an object of the invention to provide an outputting apparatus and method which can select a newly added font without changing information regarding the font selection in information which is supplied from the outside.

To solve the above problem, according to the present invention, there is provided an outputting apparatus comprising: memory means for storing designation information to designate a selection-impossible font from a plurality of fonts; and selecting means for selecting the most suitable font from the fonts other than the selected and instructed font in accordance with an input of selection instructing information to instruct so as to select the selection-impossible font which is designated by the designation information stored in the memory means.

The above plurality of fonts include fonts provided in the apparatus and fonts which are supplied from the outside.

The designation information is supplied from the outside.

The selection instruction information is supplied from the outside.

The selecting means has comparing means for comparing attribute information of the font instructed by the selection instruction information and attribute information of the fonts other than such a font and selects a font having the attribute information that is nearest to the attribute information of the font instructed by the selection instruction information from the fonts other than the font instructed by the selection instruction information.

To solve the above problem, according to the present invention, there is provided an outputting method whereby designation information to designate a selection-impossible font from a plurality of fonts is stored and the most suitable font is selected from the fonts other than the selected and instructed font in accordance with an input of selection instruction information to instruct so as to select the selection-impossible font which is designated by the designation information stored.

The above plurality of fonts include fonts which are provided in the apparatus and fonts which are supplied from the outside.

The designation information is supplied from the outside.

The selection instruction information is supplied from the outside.

In the selection of the font, the attribute information of the font instructed by the selection instruction information is compared with the attribute information of the fonts other than such a font, and the font having the attribute information that is nearest to the attribute information of the font instructed by the selection instruction information is selected from the fonts other than the font instructed by the selection instruction information.

According to the present invention as mentioned above, even in the case where the data supplied from the external apparatus such as a host computer or the like cannot select the newly added font, an output image can immediately be outputted by using the newly added font.

DETAILED DESCRIPTION OF THE PREFERRED EMBODIMENTS

Prior to explaining a construction of the present invention, the construction of a laser beam printer (LBP) to which the invention may be applied will be first described with reference to FIG. 11.

Figure 11:
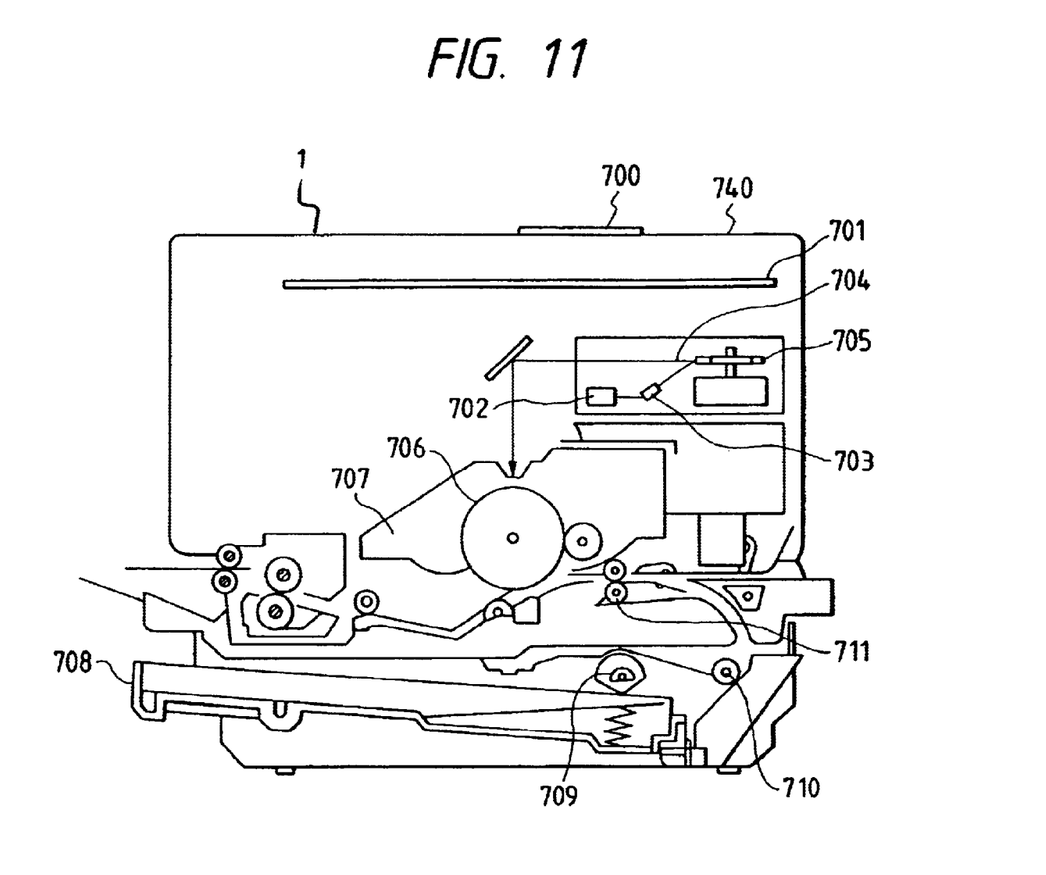
FIG. 11 is a cross sectional view showing an internal structure of an outputting apparatus to which the present invention can be applied.

FIG. 11 is a cross sectional view showing an internal structure of the laser beam printer (hereinafter, abbreviated to LBP) of an embodiment. The LBP can receive character pattern data or the like and print on a recording paper.

In the diagram, reference numeral 740 denotes an LBP main body which forms an image onto the recording paper as a recording medium on the basis of a character pattern or the like which is supplied; 700 an operation panel on which switches for operations, an LED display, and the like are arranged; and 701 a printer control unit for controlling the whole LBP 740 and analyzing character pattern information or the like. The printer control unit 701 mainly converts the character pattern information into a video signal and supplies it to a laser driver 702.

The laser driver 702 is a circuit to drive a semiconductor laser 703 and switches a laser beam 704, which is emitted from the semiconductor laser 703, on and off in accordance with an input video signal. The laser beam 704 is deviated to the right and left by a rotary polygon mirror 705 and scans an electrostatic drum 706, thereby forming an electrostatic latent image of a character pattern onto the drum 706. The latent image is developed by a developing unit 707 around the drum 706 and, after that, the developed image is transferred onto the recording paper. A cut sheet is used as a recording paper. The cut sheet recording papers are enclosed in a sheet cassette 708 attached in the LBP 740. The paper is conveyed into the apparatus by a paper feed roller 709 and conveying rollers 710 and 711 and fed to the drum 706.

A control portion in the printer with the above structure will now be described in more detail.

The invention is not limited to the printer with the above construction but can be also applied to other printers such as LED printer, ink jet printer, and the like. A display apparatus such as CRT, LCD, or the like can be also used as an outputting apparatus.

(First Embodiment)

Figure 1:
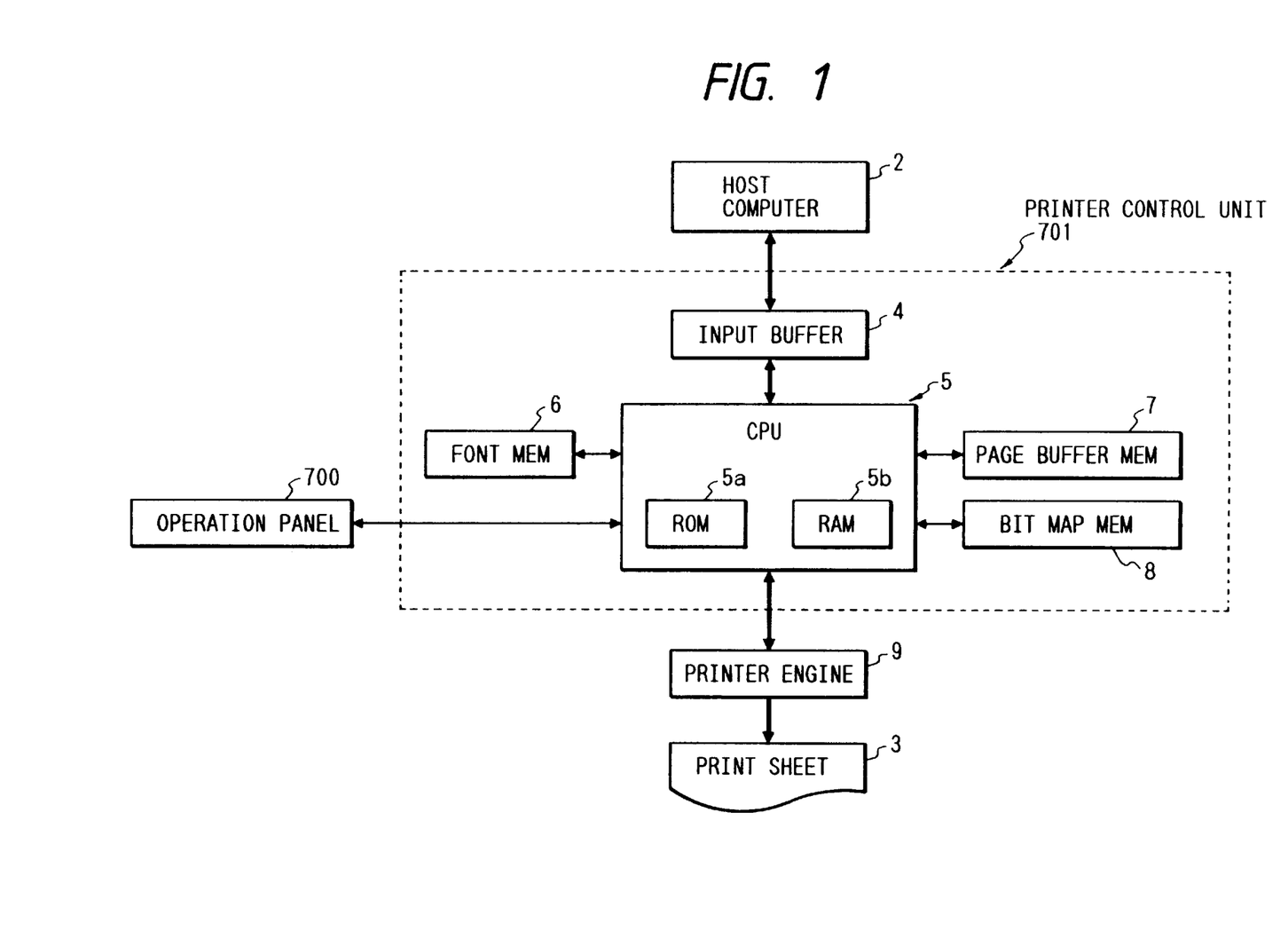
FIG. 1 is a block diagram showing a fundamental construction of an outputting apparatus according to the first embodiment of the present invention.

FIG. 1 is a block diagram showing a practical construction of the printer control unit 701. In the diagram, reference numeral 2 denotes a host computer which generates print information comprising print data, control code, and the light which is supplied to the printer control unit 701. Reference numeral 4 denotes an input buffer for receiving the print information from the host computer 2 and storing the same; 5 a CPU to control the whole printer control unit 701; 5a a ROM in which operation processing procedures (programs regarding flowcharts shown in FIGS. 2 and 4 and the like) of the CPU 5 have been stored; 5b a RAM which is used as a work area or the like by the CPU 5; 7 a page buffer memory to store the received data every page; and 8 a bit map memory to store an output image of one page. Each of the input buffer 4, page buffer memory 7, and bit map memory 8 is also constructed by a RAM. Reference numeral 9 denotes a printer engine to actually print the output image and 6 indicates a font memory to store various kinds of fonts. The font memory 6 is constructed by a ROM. Reference numeral 3 denotes a recording medium such as a paper or the like to record the result of the printing, and 700 indicates the operation panel which is used by the user to select a desired font or display various kinds of messages or the like to the user.

According to the embodiment, all of the fonts designated on the host computer 2 side are set on the printer 1 side and are substituted by preferential fonts which are preferentially used. The preferential fonts or the like are set by the operation panel 700. A processing procedure in this case will now be described with reference to a flowchart shown in FIG. 2 together with FIG. 1.

Figure 2:
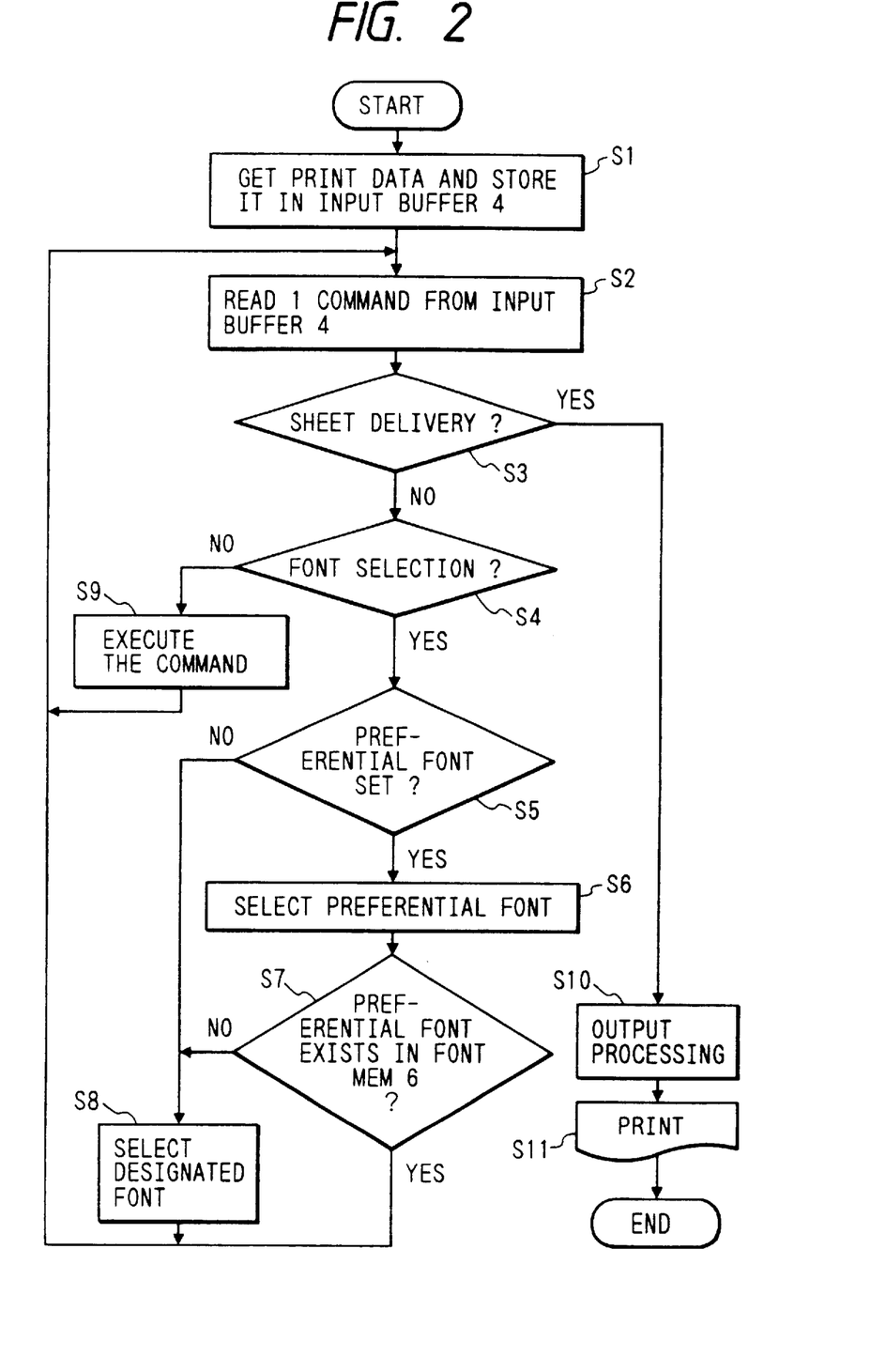
FIG. 2 is a flowchart showing a control procedure in the outputting apparatus of FIG. 1.

First, in step 1, the print data is derived from the host computer 2 and stored into the input buffer 4. In step 2, one command is read out from the input buffer 4 and supplied to the CPU 5. After that, in step 3, a check is made to see if the command which has been read in step 2 is a sheet delivery command or not. If NO, step 4 follows and a check is made to see if the command read out in step 2 is a command regarding the font selection or not. If NO in step 4, step 9 follows and a processing according to the command is executed and, after that, the processing routine is returned to step 2. If it is determined in step 4 that the command is the command regarding the font selection, step 5 follows and a check is made to see if a preferential font has been set in the operation panel 700 or not. If NO in step 5, step 8 follows and the font (hereinafter, referred to as a designated font) designated on the host computer 2 side is selected as is and, after that, the processing routine is again returned to step 2. When it is determined in step 5 that a preferential font has been set, step 6 follows and the designated font is replaced by the preferential font and selected. When the font which has been designated as a preferential font is selected, step 7 follows and a check is made to see if the designated font exists in the font memory 6 or not. When such a font does not exist, step 8 follows and the designated font selected before step 6 is again selected. When it is decided in step 7 that the preferential font exists in the font memory 6, the processing routine is again returned to step 2. When it is decided in step 3 that the command is the sheet delivery command, step 10 follows and an output processing is executed and the output image stored in the bit map memory 8 is printed onto the print sheet 3 in step 11. After that, the above processing routine is finished.

(Second Embodiment)

Figure 3:
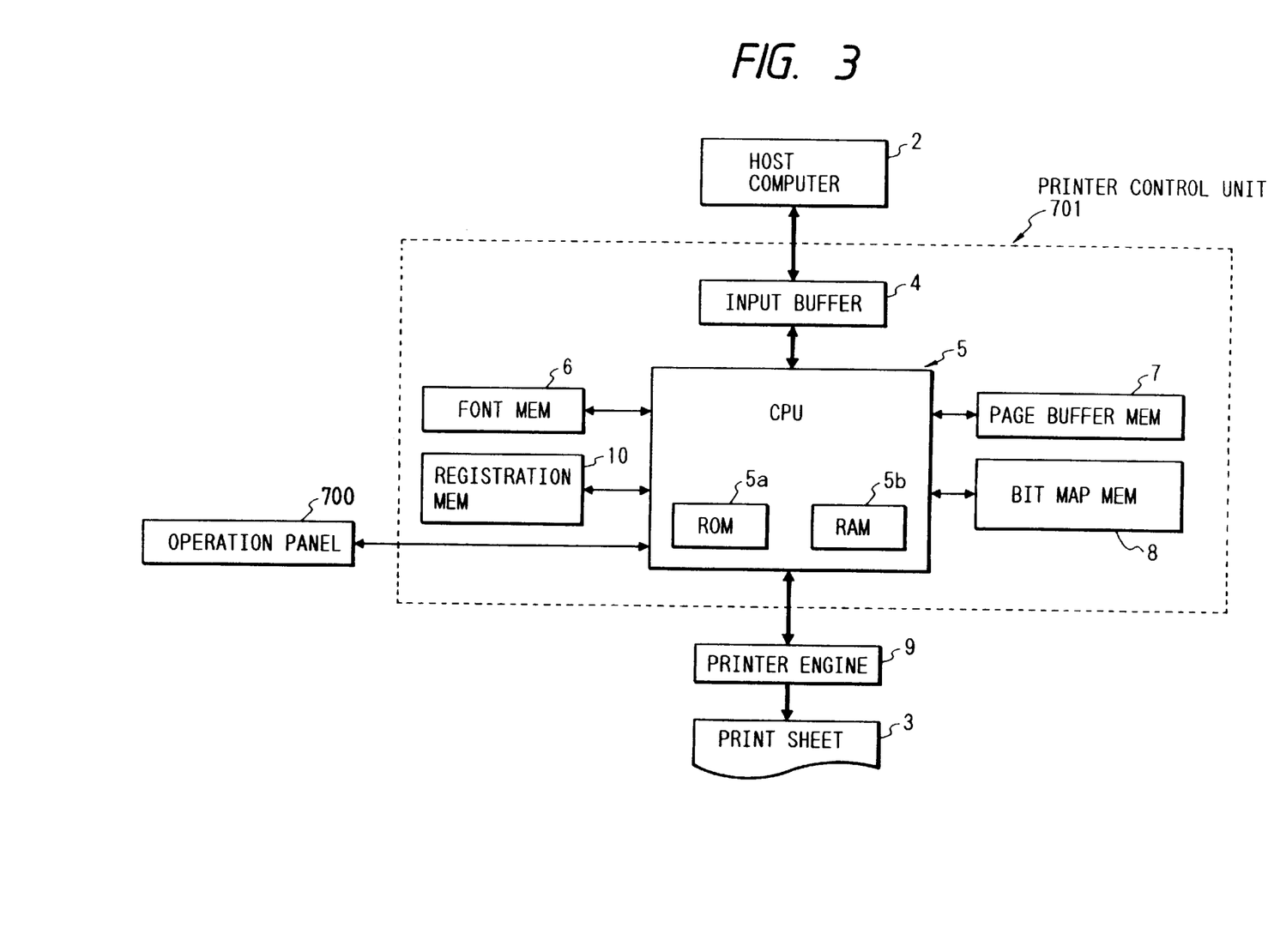
FIG. 3 is a block diagram showing a fundamental construction of an outputting apparatus according to the second embodiment of the present invention.
Figure 4:
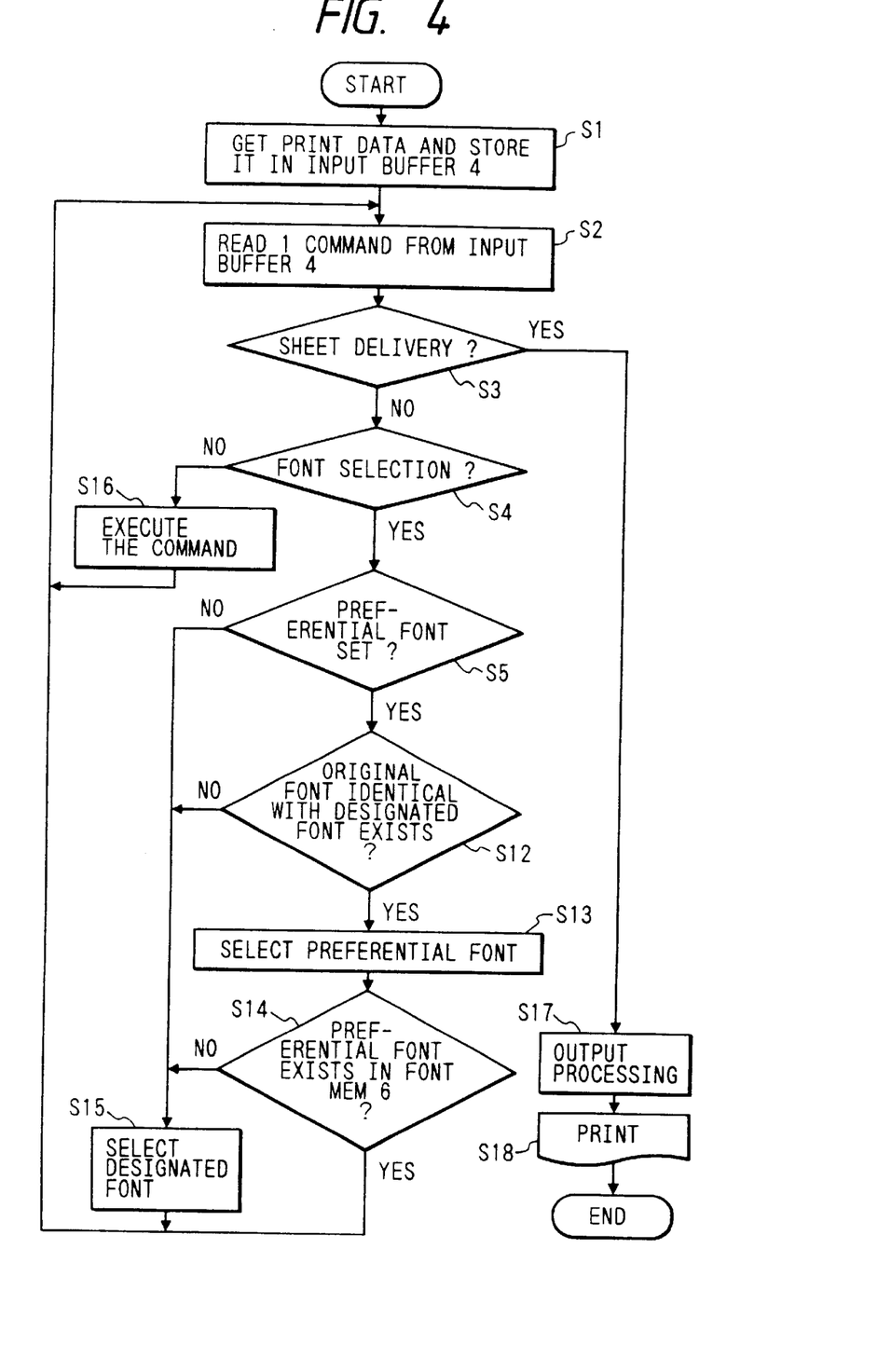
FIG. 4 is a flowchart showing a control procedure in the outputting apparatus of FIG. 3.

The second embodiment of the invention will now be described with reference to FIGS. 3 and 4.

In the second embodiment, the same portions as those in the first embodiment mentioned above are designated by the same reference numerals in the diagrams and will be explained.

As will be obviously understood from FIG. 3, the second embodiment differs from the above first embodiment in that a registration memory 10 to register and store information indicating which font is to be replaced by which other font is added to the construction of FIG. 1, thereby enabling an arbitrary font by be replaced to an arbitrary font (hereinafter, a font to be replaced is referred to as an original font and a font by which such an original font is replaced is referred to as a preferential font). The original font, the preferential font, and the like are set by the operation panel 700. A processing procedure in this instance will now be described with reference to a flowchart shown in FIG. 4 together with FIG. 3. A processing procedure in steps 1 to 5 in FIG. 4 is similar to that in steps 1 to 5 in FIG. 2 of the forgoing first embodiment. A processing procedure in steps 13 to 18 in FIG. 4 is similar to that in steps 6 to 11 in FIG. 2. When it is decided in step 5 that the preferential font is not set, the font (hereinafter, referred to as a designated font) designated on the host computer 2 side is selected. When it is decided in step 5 that the preferential font is designated, step 12 follows and a check is made to see if the original font which coincides with the designated font exists or not by referring to the registration memory 10. When it is decided in step 12 that the coincident original font doesn't exist, step 15 follows and the designated font is selected. When it is determined in step 12 that the coincident original font exists, step 13 follows and the preferential font corresponding to the coincident original font is selected. A subsequent processing procedure in steps 14 to 18 is similar to that in steps 7 to 11 in FIG. 2 of the first embodiment mentioned above.

Although each of the above embodiments relates to the fonts stored in the font memory 6 provided in the printer, the invention is not limited to such a case. Instead of referring to the font memory 6, by referring to a font card or font cartridge which is connected to the printer, fonts other than the fonts provided in the printer can be used or their fonts can be also mixedly used. Although the memory has been described as physically divided, the above construction can be also realized by one memory. On the other hand, the preferential font or the like can be also set by a command from the outside instead of the operation panel. Although the example of the laser beam printer has been shown as an outputting apparatus in each of the above embodiments, the invention is not limited to such a case. Various kinds of printers such as LED printer, ink jet printer, and the like, or displays such as CRT, LCD, and the like can be also used.

(Third Embodiment)

Figure 5:
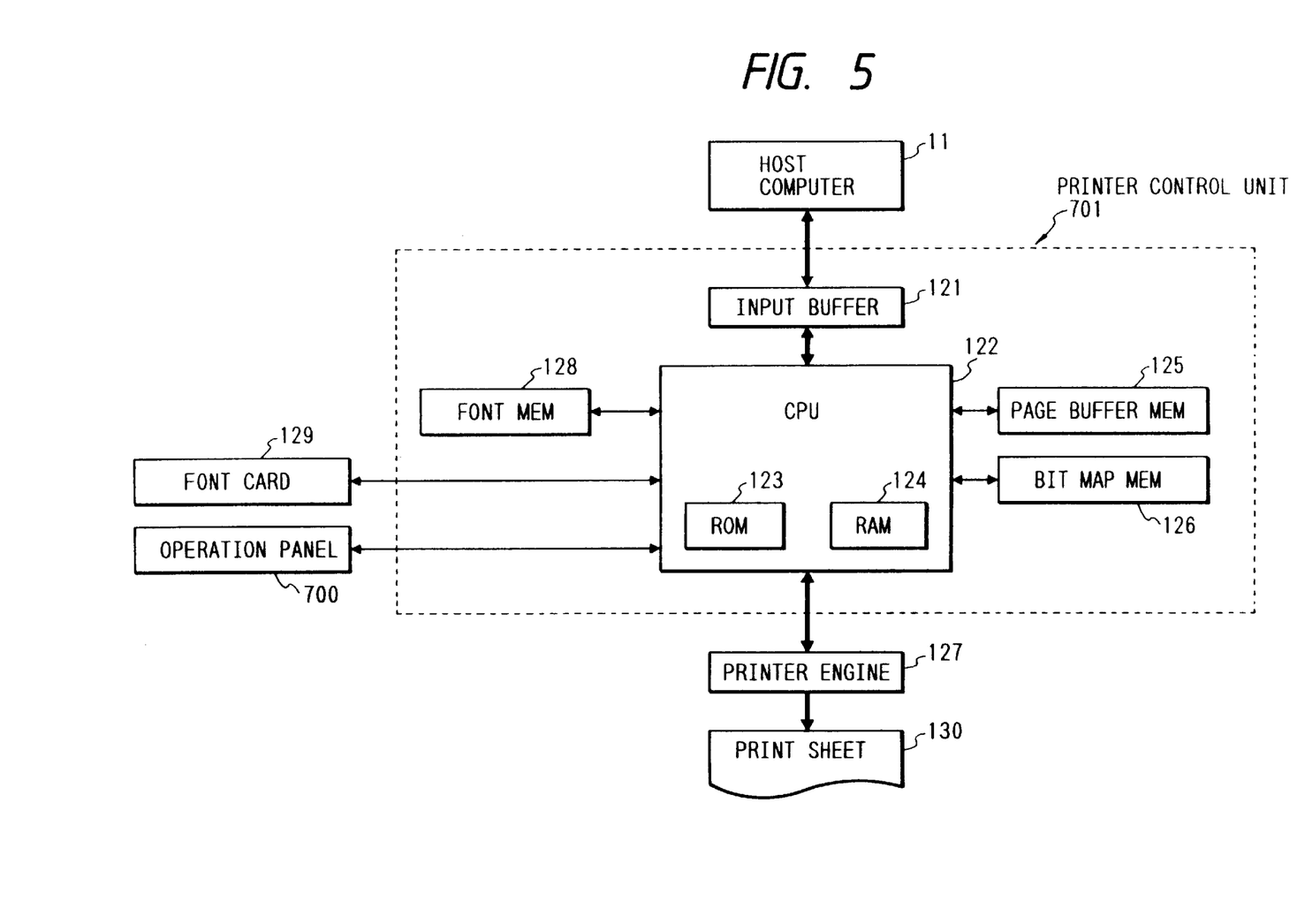
FIG. 5 is a block diagram showing a fundamental construction of an outputting apparatus according to the third embodiment of the present invention.

FIG. 5 is a block diagram showing a practical construction of the printer control unit 701. In the diagram, reference numeral 11 denotes a host computer which supplies print information comprising print data, control codes, and the like to the printer control unit 701; 121 an input buffer for receiving the print information from the host computer 11 and storing the same; 122 a CPU to control the whole printer control unit 701; 123 a ROM in which operation processing procedures (programs regarding flowcharts in FIGS. 6, 8, and 9 and the like) of the CPU 122 have been stored; 124 a RAM which is used as a work area or the like of the CPU 122; 125 a page buffer memory to store the received data page by page; and 126 a bit map memory to store an output image of one page. Each of the above input buffer 121, page buffer memory 125, and bit map memory 126 is also constructed by a RAM. Reference numeral 127 denotes a printer engine to actually print the output image; 128 a font memory to store various kinds of fonts; and 129 a font card to store various kinds of added fonts. Each of the font memory 128 and font card 129 is constructed by a ROM. Reference numeral 130 denotes a recording medium such as a paper to record the print result or the like. Reference numeral 700 denotes the operation panel for allowing the user to select a desired font or to display various kinds of messages or the like to the user.

According to the third embodiment, the existing font "font A" stored in the font memory 128 in the outputting apparatus is set into a selection-impossible state by the operation panel 700, which means that "font A" cannot be selected and that "font B" in the font card 129 will be selected in place of "font A".

Figure 6:
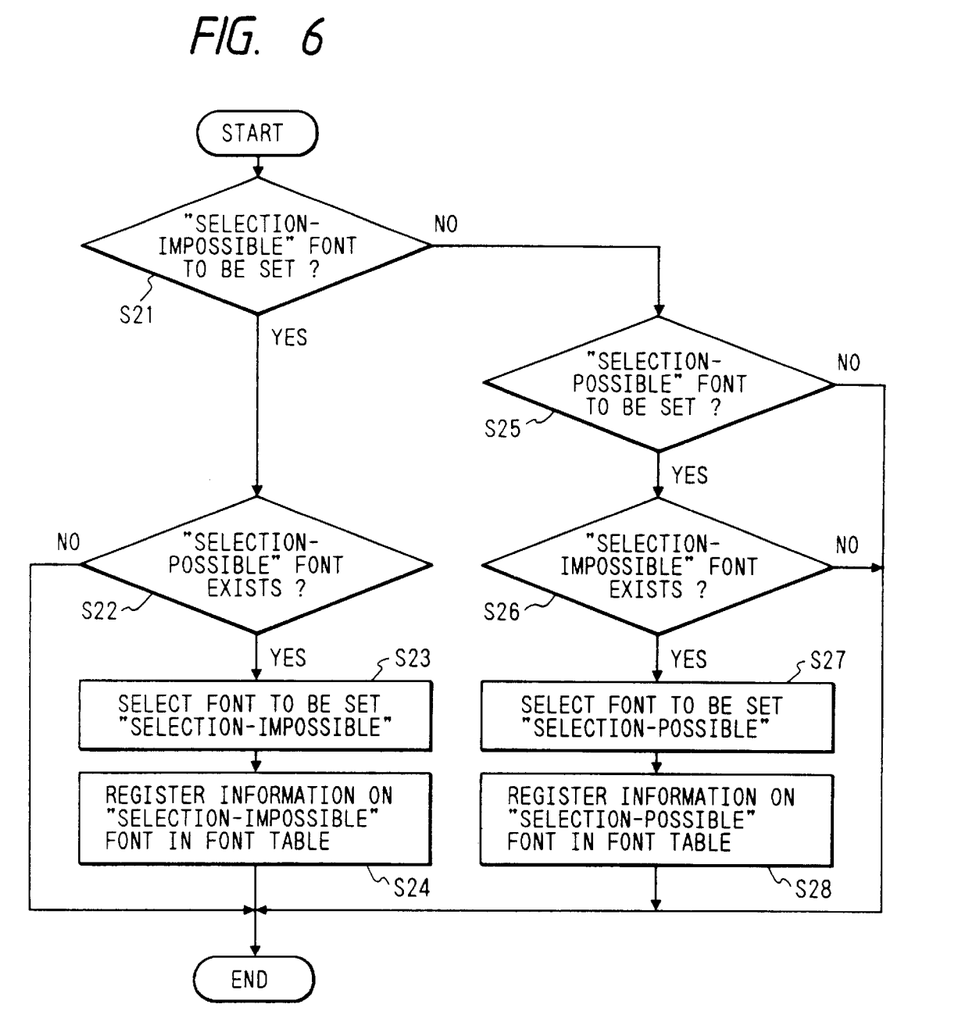
FIG. 6 is a flowchart showing a control procedure in the outputting apparatus of FIG. 5.
Figure 7:
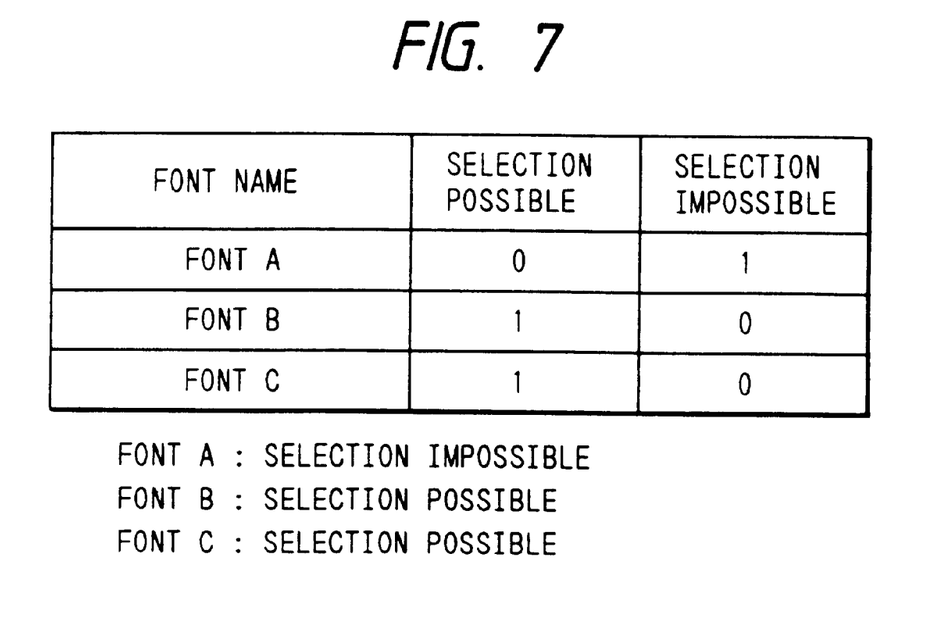
FIG. 7 shows an example of a font table in the third embodiment.

A processing procedure to set a selection-possible/selection-impossible state of a font by the operation panel 700 will now be described with reference to the flowchart of FIG. 6 and FIG. 7. FIG. 7 shows a font table which is provided in the work area of the RAM 124 in FIG. 5 and stores information indicating whether a font can be selected or not. A proper font can be selected only from the fonts registered in the font table as selectable fonts. Not only the internal fonts stored in the font memory 128 but also those in external memory media such as font card 129 and the like are registered as selectable fonts if such external memory media are attached to the LBP. That is, according to the embodiment, only the fonts provided in the outputting apparatus are set to the target fonts to be set into the selection-impossible state. The selection-possible/selection-impossible state of the font is set from the operation panel 700. When a font is to be set into the selection-impossible state in step S21, step S22 follows. If the font is not currently in the selection-possible state in Step 22, the processing routine is finished. When the font is currently in the selection-possible state, the font is set instead into the selection-impossible state in step S23. Information indicating that this font cannot be selected is then registered into a font table in FIG. 7 in step S24. In the case where the font is not to be set to the selection-impossible state in step S21, step S25 follows. In the case where a font which had been set into the selection-impossible state is to be set into the selection-possible state, step S26 follows. If NO in step S25, the processing routine is finished. A check is made in step S26 to see if the number of fonts set into the selection-possible state is equal to one or more or not. If YES in step S26, the fonts to be set into the selection-possible state are selected in step S27 and the processing routine advances to step S28. If NO in step S26, the processing routine is finished. In step S28, information indicating that such a font can be selected is registered into the font table. For instance, the font table of FIG. 7 shows that "font A" is set into the selection-impossible state from the selection-possible state and that "font B" and "font C" in the font card can be selected.

Figure 8:
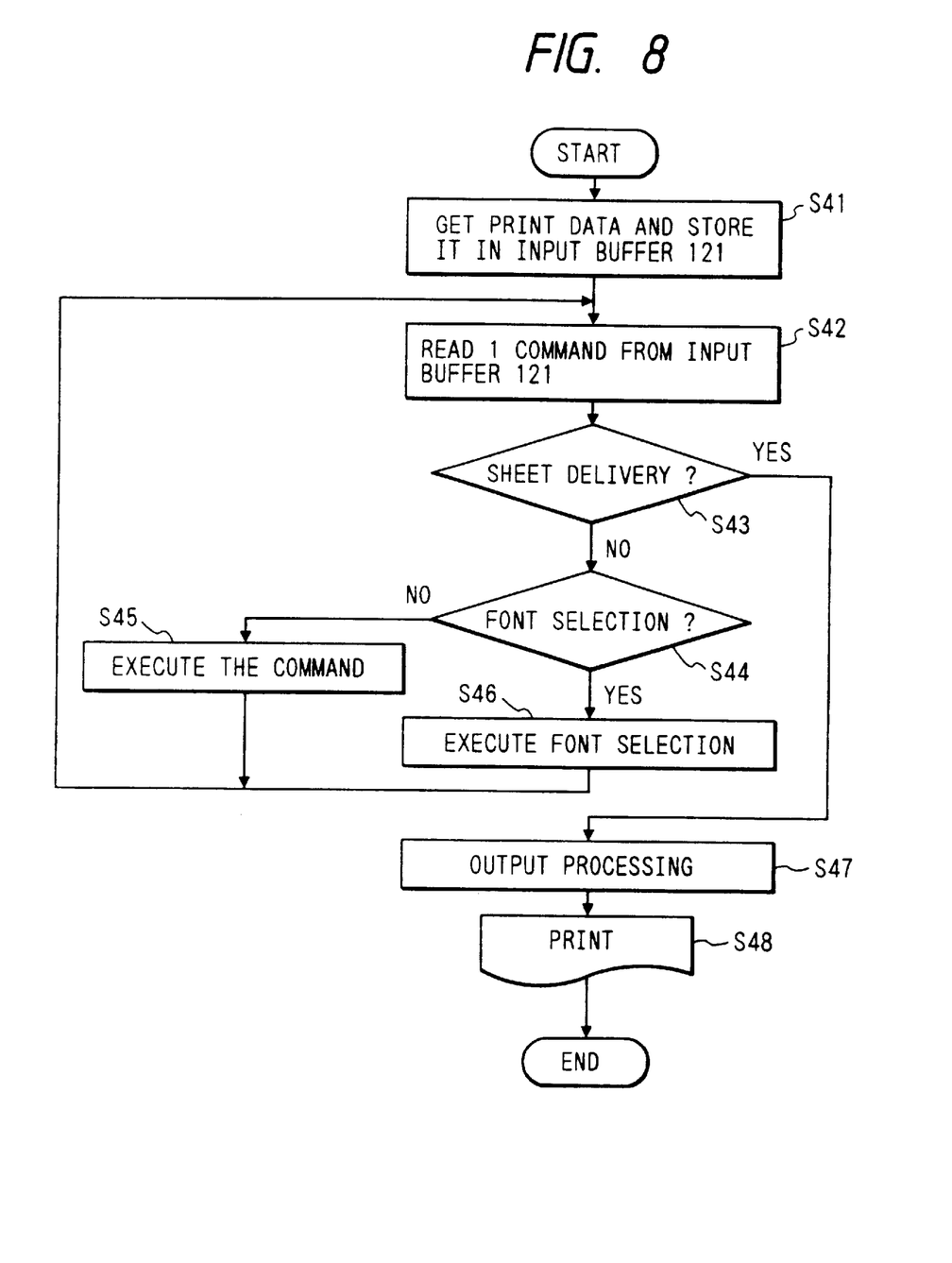
FIG. 8 is a flowchart showing a control procedure in the outputting apparatus of FIG. 5.

A flow of the whole print data processing will now be described with reference to the flowchart shown in FIG. 8. First, the print data is derived from the host computer 11 and stored into the input buffer 121 (step S41). One command is read out from the input buffer 121 (step S42). A check is made to see if the command is a sheet delivery command or not (step S43). In case of the sheet delivery command, an output processing is executed (step S47) and the print data is printed (step S48). Specifically, the data stored in the page buffer memory 125 page by page is developed as a bit map in the bit map memory 126, an output image is formed, and the output image is supplied as a video signal to the printer engine 127. The print result is recorded on the recording medium 130. If NO in step S43, step S44 follows and a check is made to see if the command is a command regarding font selection or not. If NO in step S44, step S45 follows and the command is analyzed and processing corresponding to the command is executed. Practically speaking, the data stored in the input buffer 121 is stored into the page buffer memory 125 page by page. When it is decided in step S44 that the command is a command regarding font selection, step S46 follows and font selection processing is executed. The processing routine is returned to step S42.

Figure 9:
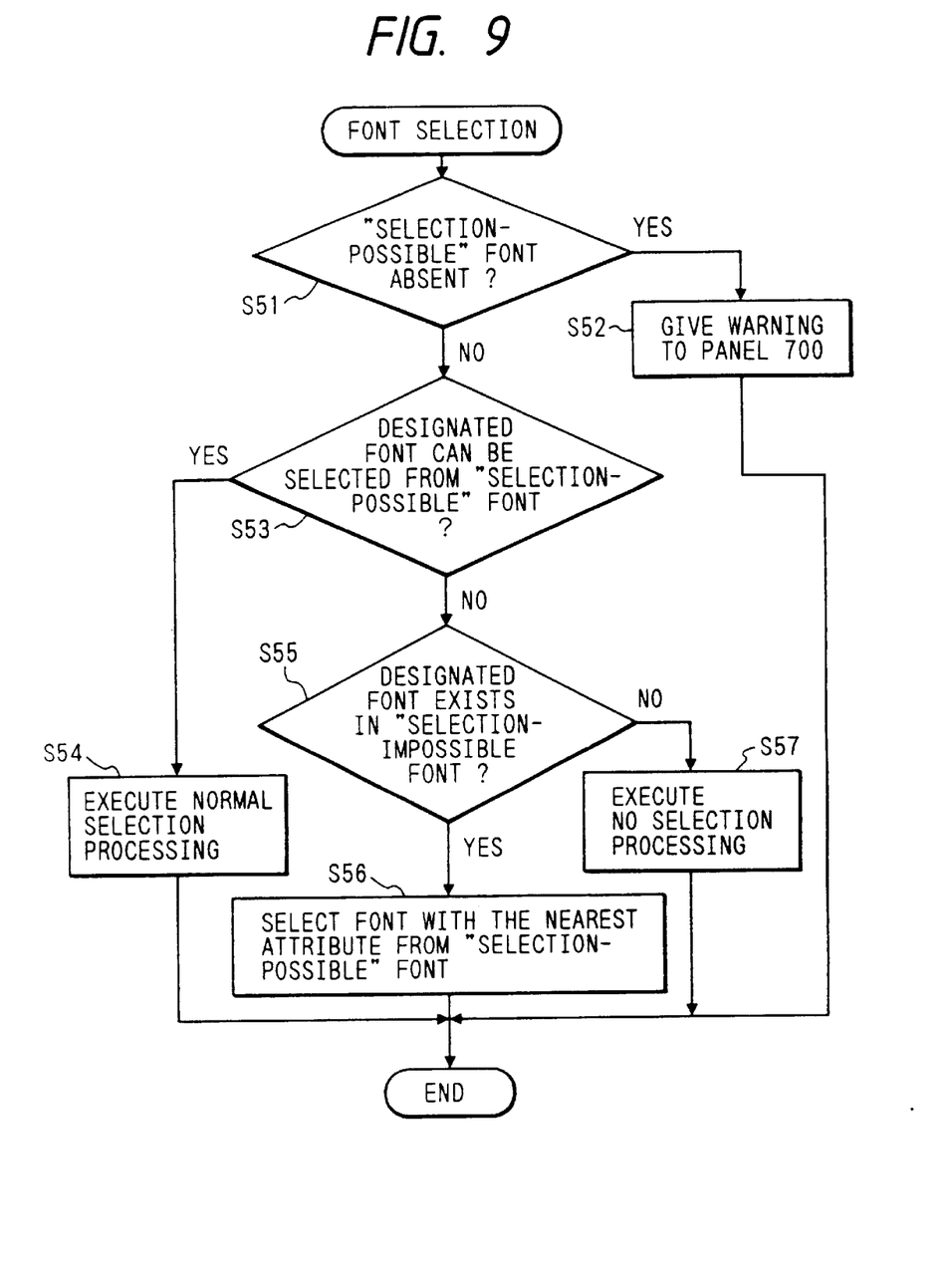
FIG. 9 is a flowchart showing a control procedure in the outputting apparatus of FIG. 5.

The font selection processing in step S46 will now be described in detail with reference to FIG. 9.

First, the font table formed temporarily in the work area in the RAM 124 is searched in step S51. When it is decided that there is no selectable font, no character can be printed. Therefore, the processing routine advances to step S52 and a warning is generated to the operation panel 700 and the processing routine is finished. When a selectable font exists in step S51, step S53 follows and a check is made to see if the designated font can be selected from the fonts which have been set into the selection-possible state in the font table shown in FIG. 7 or not. If YES in step S53, step S54 follows and normal selection processing is executed in a manner similar to the conventional method. When the designated font cannot be found in the selectable fonts, step S55 follows and a check is made to see if the designated font exists in the fonts which have been set into the selection-impossible state or not. If YES in step S55, step S56 follows and the font having the attribute that is nearest to the attribute of the designated font is selected from the selectable fonts.

For instance, it is now assumed that "font A" in the font memory 128 cannot be selected and "font B" and "font C" in the font card 129 are loaded (namely, can be selected) as shown in FIG. 7.

Figure 10:
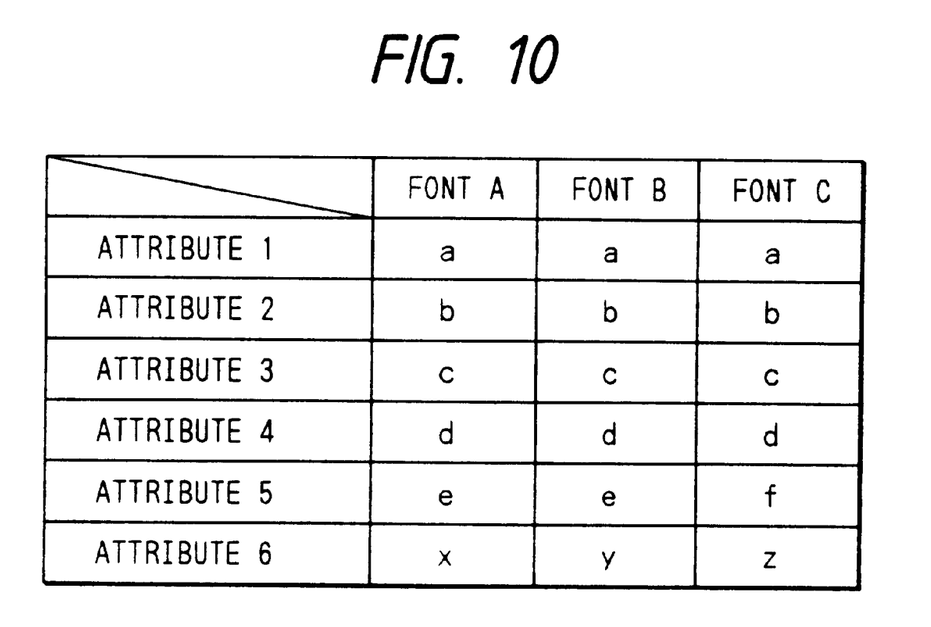
FIG. 10 shows an example of an attribute table in the third embodiment.

When "font A" is designated by the operation panel 700, no font can be selected in step S53, so that the processing routine advances to step S55. Since "font A" set in the selection-impossible state is found in step S55, the processing routine advances to step S56. When it is determined that font having the attribute that is nearest to the attribute of "font A" in the selectable fonts is "font B", "font B" is selected. For example, it is now assumed that the respective fonts have attributes as shown in FIG. 10. Those attributes have the priorities. The attribute 1 has the highest priority and the attribute 6 has the lowest priority. As for "font A", "font B", and "font C", their attributes 1 to 4 are equal, the attribute 5 of only "font C" differs, and it is now assumed that the attributes 6 are set to the peculiar attributes such as numbers indicative of type styles such as Ming-style type, text-style type, and the like. When the attribute of "font A" and the attributes of "font B" and "font C" are sequentially compared in order from the higher priority, they are equal up to the attribute 4, so that the candidate cannot be determined by one attribute. However, when looking at the attributes 5, the attribute of "font C" differs from the attribute of "font A", which is equal to the attribute of "font B", so that "font B" is selected as the font having the attribute that is nearest to the attribute of "font A". When only the font card "font C" is loaded into the apparatus, "font A" is replaced by "font C" and can be outputted. The attribute table shown in FIG. 10 is formed in the work area in the RAM 124 in a manner similar to the font table shown in FIG. 7. When the designated font cannot be found in step S55, such a font is undefined and cannot be selected. Therefore, the designation of the font is ignored and step S57 follows and the font which has been set just before is used.

According to the embodiment as mentioned above, in the outputting apparatus which can set the selection-possible/selection-impossible state of the existing fonts, the existing font having the attribute which is most adaptive to the font selection information supplied from an external apparatus such as a host computer or the like can previously be set into the selection-impossible state. In this case, on the assumption that no selection-impossible font exists, by executing processing to select the font having the attribute that is nearest to the supplied font selection information from the fonts other than such a selection-impossible font, the newly added font can be selected in place of the existing font which has been set into the selection-impossible state.

In the embodiment, the priorities are given to the attributes and the attributes are sequentially compared in order from the higher priority. When only one candidate is found as a font, such a font is defined as the font having the nearest attribute. However, it is also possible to use another defining method such that a font in which the number of coincident attributes is the largest is set to be the font having the nearest attribute, or the like.

In the embodiment, the font is designated by the operation panel. However, the attribute of the font can be also designated. On the other hand, the font attribute can be also designated by a command.

In the above embodiment, no warning is generated at the stage of setting the font into the selection-possible/selection-impossible state. However, it will be obviously understood that no correct data can be outputted in the case where in spite of the fact that a font card or the like is not loaded, all of the internal fonts are set into the selection-impossible state or the like. Therefore, a warning can be also generated at such a time point.

In the above embodiment, the selection-possible/selection-impossible state of the font is set by the operation panel. However, such a setting can be also performed by a command.

In case of performing a down-loading operation of fonts such as registration of external characters or the like from the host computer, it is also possible to construct the embodiment in a manner such that the setting of the selection-impossible state is cancelled to thereby enable the down-loading of the font to be executed, and when the font is again set into the selection-possible state, the down-loaded font can be used.

In the case where an external character is registered in a certain font and such a font is set into the selection-impossible state, even if the information of the external character is left, it is meaningless. Therefore, the information of an external character accompanying with such a font can be also erased.

The present invention can be also applied to a system comprising a plurality of apparatuses or to an apparatus comprising one equipment. The invention can be also applied to the case where the invention is accomplished by supplying a program to a system or an apparatus.

What is claimed is:

1. A character processing apparatus comprising:
   a setting unit, arranged to set a replacement font, selected by a user, by which a designated font is to be replaced;
   a discriminating unit, arranged to discriminate, in response to inputting of a font selection command, whether the replacement font has been set by said setting unit; and
   a processor, arranged to replace the designated font by the replacement font set by said setting unit and process a character print with the replacement font if said discriminating unit discriminates that the replacement font has been set, and to process the character print with the designated font if said discriminating unit discriminates that the replacement font has not been set.

2. An apparatus according to claim 1, further comprising a second discriminating unit, arranged to discriminate whether the font corresponding to the replacement font is stored in said character processing apparatus responsive to a discrimination that the replacement font has been set, wherein said processor processes the character print with the font corresponding to the designated font if said second discriminating unit discriminates that the font corresponding to the replacement font is not stored.

3. An apparatus according to claim 1, wherein said setting unit sets a font replacement condition indicating that an arbitrary designated font is to be replaced by an arbitrary replacement font.

4. An apparatus according to claim 1, wherein said setting unit sets a font replacement condition indicating that all designated fonts are to be replaced by respective replacement fonts.

5. An apparatus according to claim 1, wherein said setting unit comprises an operation panel.

6. A character processing method comprising the steps of:
   setting a replacement font, selected by a user, by which a designated font is to be replaced;
   discriminating, in response to inputting of a font selection command, whether the replacement font has been set in said setting step; and
   replacing the designated font by the replacement font set in the setting step and processing a character print with the replacement font if it is discriminated that the replacement font has been set, and processing the character print with the designated font if it is discriminated that the replacement font has not been set.

7. The method according to claim 6, further comprising the steps of:
   determining whether the font corresponding to the replacement font is stored in the character processing apparatus if it is discriminated that the replacement font has been set, and processing the character print with the font corresponding to the designated font if it is determined that the font corresponding to the replacement font is not stored in the character processing apparatus.

8. The method according to claim 6, wherein the setting step includes setting a font replacement condition indicating that an arbitrary designated font is to be replaced by an arbitrary replacement font.

9. The method according to claim 6, wherein the setting step includes setting a font replacement condition indicating that all designated fonts are to be replaced by respective replacement fonts.

10. The method according to claim 6, wherein the setting step is performed using an operation panel.

11. A computer readable storage medium that stores program code for executing a character processing method comprising the steps of:

setting a replacement font, selected by a user, by which a designated font is to be replaced;

discriminating, in response to inputting of a font selection command, whether the replacement font has been set in said setting step; and replacing the designated font by the replacement font set in the setting step and processing a character print with the replacement font if it is discriminated that the replacement font has been set, and processing the character print with the designated font if it is discriminated that the replacement font has not been set.

12. The computer readable storage medium of claim 11, further storing program code for executing the steps of:

determining whether the font corresponding to the replacement font is stored in the character processing apparatus if it is discriminated that the replacement font has been set, and processing the character print with the font corresponding to the designated font if it is determined that the font corresponding to the replacement font is not stored in the character processing apparatus.

13. The computer readable storage medium of claim 11, wherein the setting step includes setting a font replacement condition indicating that an arbitrary designated font is to be replaced by an arbitrary replacement font.

14. The computer readable storage medium of claim 11, wherein the setting step includes setting a font replacement condition indicating that all designated fonts are to be replaced by respective replacement fonts.

15. The computer readable storage medium of claim 11, wherein the setting step is performed using an operation panel.

16. A computer program providing code for executing the steps of:

setting a replacement font, selected by a user, by which a designated font is to be replaced;

discriminating, in response to inputting of a font selection command, whether the replacement font has been set in said setting step; and replacing the designated font by the replacement font set in the setting step and processing a character print with the replacement font if it is discriminated that the replacement font has been set, and processing the character print with the designated font if it is discriminated that the replacement font has not been set.

17. The computer program of claim 16, further providing code for executing the steps of:

determining whether the font corresponding to the replacement font is stored in the character processing apparatus if it is discriminated that the replacement font has been set, and processing the character print with the font corresponding to the designated font if it is determined that the font corresponding to the replacement font is not stored in the character processing apparatus.

18. The computer program of claim 16, wherein the setting step includes setting a font replacement condition indicating that an arbitrary designated font is to be replaced by an arbitrary replacement font.

19. The computer program of claim 16, wherein the setting step includes setting a font replacement condition indicating that all designated fonts are to be replaced by respective replacement fonts.

20. The computer program of claim 16, wherein the setting step is performed using an operation panel.

21. A character processing apparatus according to claim 1, further comprising a printer.

* * * * *

UNITED STATES PATENT AND TRADEMARK OFFICE
CERTIFICATE OF CORRECTION

| | | |
|---|---|---|
| PATENT NO. | : 6,738,149 B2 | |
| APPLICATION NO. | : 08/007093 | |
| DATED | : May 18, 2004 | |
| INVENTOR(S) | : Watanabe | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (42) days Delete the phrase "by 42" and insert --by 0 days--

ON TITLE PAGE AT (56) FOREIGN PATENT DOCUMENTS

"63173651" should read --63-173651--; and
"63276571" should read --63-276571--.

COLUMN 4

Line 42, "forgoing" should read --foregoing--.

COLUMN 5

Line 59, "Step 22," should read --step S22,--.

COLUMN 7

Line 1, "that" should read --that the--.

UNITED STATES PATENT AND TRADEMARK OFFICE
CERTIFICATE OF CORRECTION

PATENT NO. : 6,738,149 B2
APPLICATION NO. : 08/007093
DATED : May 18, 2004
INVENTOR(S) : Watanabe It is certified that error appears in the above-identified patent and that said Letters Patent is hereby corrected as shown below:

<u>COLUMN 8</u>

Line 14, "equipment." should read --item of equipment--.

Signed and Sealed this

Thirtieth Day of December, 2008

JON W. DUDAS
*Director of the United States Patent and Trademark Office*